(12) United States Patent
Soecknick

(10) Patent No.: US 8,696,912 B2
(45) Date of Patent: Apr. 15, 2014

(54) RAW WATER HARDNESS DETERMINATION IN A WATER TREATMENT SYSTEM VIA THE CONDUCTIVITY OF SOFT OR BLENDED WATER

(75) Inventor: Ralf Soecknick, Kornwestheim (DE)

(73) Assignee: JUDO Wasseraufbereitung GmbH, Winnenden (DE)

( * ) Notice: Subject to any disclaimer, the term of this patent is extended or adjusted under 35 U.S.C. 154(b) by 0 days.

(21) Appl. No.: 13/514,590

(22) PCT Filed: Dec. 15, 2010

(86) PCT No.: PCT/EP2010/069720
§ 371 (c)(1), (2), (4) Date: Jun. 7, 2012

(87) PCT Pub. No.: WO2011/080075
PCT Pub. Date: Jul. 7, 2011

(65) Prior Publication Data
US 2012/0261346 A1    Oct. 18, 2012

(30) Foreign Application Priority Data

Dec. 18, 2009  (DE) .................. 10 2009 055 007

(51) Int. Cl.
*B01D 15/04*      (2006.01)

(52) U.S. Cl.
USPC ............ 210/687; 210/662; 210/790; 210/434

(58) Field of Classification Search
USPC .................. 210/662, 790, 434, 336, 339, 687
See application file for complete search history.

(56) References Cited

U.S. PATENT DOCUMENTS

| 2,711,995 | A | * | 6/1955 | Sard .............................. 210/662 |
| 3,368,969 | A | * | 2/1968 | Palen ............................ 210/698 |
| 3,676,336 | A | * | 7/1972 | O'Brien et al. ............... 210/662 |
| 2007/0215531 | A1 | | 9/2007 | Wawrla et al. |
| 2010/0301882 | A1 | * | 12/2010 | Socknick et al. ............. 324/694 |
| 2011/0139720 | A1 | | 6/2011 | Soecknick et al. |

FOREIGN PATENT DOCUMENTS

| CN | 1526649 A | 9/2004 |
| DE | 198 38 668 A1 | 3/1999 |
| DE | 100 11 692 A1 | 9/2001 |
| DE | 10 2007 013 203 A1 | 9/2007 |
| DE | 10 2007 059 058 B3 | 7/2009 |
| DE | 10 2008 045 354 B3 | 2/2010 |
| EP | 1 002 495 A1 | 11/1998 |
| JP | 2004261768 A | 9/2004 |
| WO | WO 2009/071066 A2 | 6/2009 |
| WO | WO2009071066 | * | 6/2009 |

OTHER PUBLICATIONS

Azoulay et al., Table 2, "Mineral Content of Tap Water in Major North American Cities," PubMed, Mar. 2001.*
Azoulay et al, Table 2, "Mineral Content of Tap Water in Major North American Cities," PubMed, Mar. 2001.*

* cited by examiner

*Primary Examiner* — Nam Nguyen
*Assistant Examiner* — Claire Norris
(74) *Attorney, Agent, or Firm* — Hackler Daghighian & Martino

(57) ABSTRACT

A method of operating a water treatment system (1), having
 a softening device (4), in particular comprising an ion-exchange resin (7),
 a conductivity sensor (9),
 and electronic control device (13), and
 an automatically adjustable blending device for mixing a blended water stream $V(t)_{blend}$ from a first, softened part-stream $V(t)_{part1soft}$ and a second, raw-water-carrying part-stream $V(t)_{part2raw}$,
is characterized in that
 the conductivity $LF_{soft}$ of the softened water or the conductivity $LF_{blend}$ of the blended water is determined experimentally,
 and in that the conductivity $LF_{raw}$ of the raw water and/or the total hardness of the raw water is derived from the experimentally determined conductivity $LF_{soft}$ of the softened water or $LF_{blend}$ of the blended water.
With the invention, inexpensive and permanently reliable control of a water treatment system, in particular of the regeneration and blending, is possible.

10 Claims, 3 Drawing Sheets

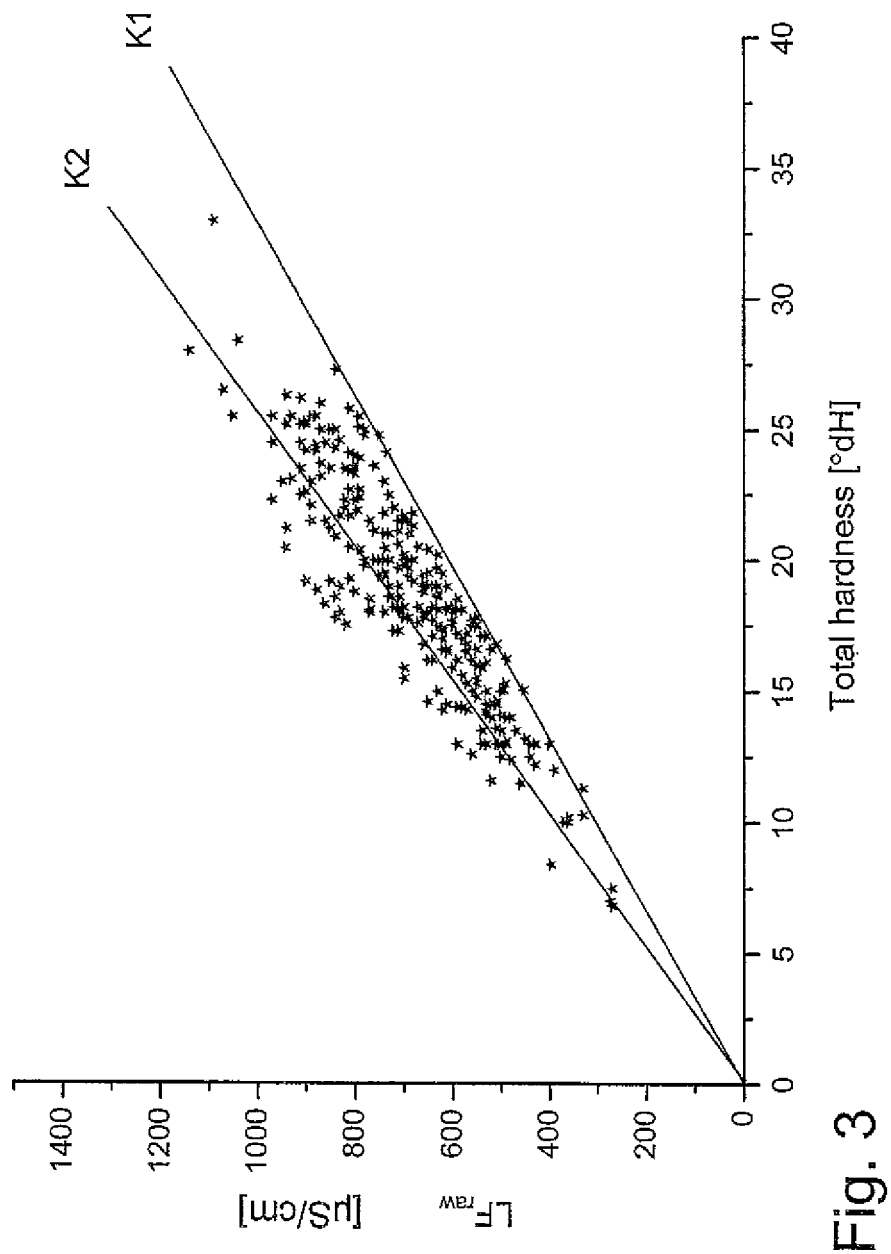

RAW WATER HARDNESS DETERMINATION IN A WATER TREATMENT SYSTEM VIA THE CONDUCTIVITY OF SOFT OR BLENDED WATER

The invention relates to a method for operating a water treatment system, having

- a softening device, in particular comprising art ion-exchange resin,
- a conductivity sensor,
- an electronic control device, and
- an automatically adjustable blending device for mixing a blended water stream $V(t)_{blend}$ from a first, softened part-stream $V(t)_{part1soft}$ and a second, raw-water-carrying part-stream $V(t)_{part2raw}$.

Such a method has become known from DE 10 2007 059 058 B3.

Water softening is used wherever the conventional supply systems (for example the drinking water network) provide only relatively hard water, but a softer water is desirable for technical reasons or for reasons of convenience.

In water softening, softening devices are used which work mostly according to the ion-exchange process. The hardness-producing substances (calcium and magnesium ions) contained in the water are thereby exchanged for sodium ions in an ion-exchange resin. When the ion-exchange resin becomes depleted, it must be regenerated, for example by flushing with salt brine.

For technical or economic reasons, it is often necessary or desirable to have available not completely softened water but water having a moderate but narrowly defined water hardness. For example, completely softened water can lead to corrosion problems when the formation of a protective layer in the downstream piping installation is no longer possible. In addition, the capacity of the softener is depleted quickly in the case of complete softening, and regeneration must be carried out in good time. This is associated with high salt consumption and accordingly with high costs. In order to carry out a partial softening, a device (blending device) for mixing softened water (also referred to as pure water or soft water) and raw water is necessary. It is generally desirable to adjust and control the water hardness in the blended water, that is the mixture of softened water and raw water.

DE 10 2007 059 058 B3 describes a water softening system in which the conductivity of the raw water is measured by means of a conductivity sensor. The total hardness of the raw water, which is used to control the regeneration and the blending device, is derived from the measured conductivity of the raw water on the basis of the calibration characteristics F1 and F2.

Conductivity sensors are inexpensive and simple to use, but they have the disadvantage that they use electrodes as measuring probes, which can calcify when used in hard water. The formation of a layer of limescale on the electrode surfaces can lead to malfunctions of the conductivity sensors.

SUMMARY OF THE INVENTION

The object of the present invention is to permit inexpensive and permanently reliable control of a water treatment system, in particular of the regeneration and blending.

BRIEF DESCRIPTION OF THE INVENTION

FIGS. 1-3 diagram and plot features of the present invention.

The object is achieved by a method of the type mentioned at the beginning, which is characterised in that the conductivity $LF_{soft}$ of the softened water or the conductivity $LF_{blend}$ of the blended water is determined experimentally, and in that the conductivity $LF_{raw}$ of the raw water and/or the total hardness of the raw water is derived from the experimentally determined conductivity $LF_{soft}$ of the softened water or $LF_{blend}$ of the blended water.

According to the present invention, the hardness of the raw water, which in turn is typically obtained via the conductivity of the raw water, is determined using a conductivity sensor. However, the conductivity sensor need not be arranged in the region of the water treatment system that carries raw water but can be arranged in the region of the water treatment system that carries soft or blended water. As a result, the conductivity sensor is protected from calcification and correct operation of the inexpensive conductivity sensor is permanently ensured.

The conductivity recorded by a conductivity sensor represents a sum parameter, which records the ions dissolved in the water. In the case of water that has not been softened (raw water), the conductivity is approximately proportional to the water hardness, that is to say to the content of calcium and magnesium ions.

In the water softening, the hardness-producing substances (calcium and magnesium ions) contained in the water are exchanged for sodium ions in an ion-exchange resin. One calcium or magnesium ion is thereby replaced by two sodium ions, and the conductivity in the softened water changes accordingly.

The softened water (soft water) is free of calcium and magnesium ions. Nevertheless, the conductivity measured in the softened water behaves proportionally to the content of hardness-producing substances in the original raw water. In the softened water, only the hardness-producing substances have been exchanged stoichiometrically for sodium ions; the composition and concentration of the other ions remains unchanged. The conductivity of the raw water, and accordingly the hardness of the raw water, can therefore be deduced from the measured conductivity of the softened water. The present invention makes use of this.

To that end, the conductivity of the raw water and/or the total hardness of the raw water is derived within the context of the invention from the measured value of the conductivity in the softened water by means of a suitable function or a plurality of suitable functions (which are often stored in the control device as characteristic lines). The function or functions correct the different conductivities of one calcium or magnesium ion on the one hand and two sodium ions on the other hand. If the conductivity is determined experimentally in the blended water instead of in the completely softened water, the correction must be weighted according to the percentages of the two part-streams $V(t)_{part1soft}$ and $V(t)_{part2raw}$.

It will be noted that, according to the invention, the conductivity $LF_{raw}$ of the raw water and the total hardness of the raw water are typically derived without previously determining the blended water hardness. The blended water hardness can be calculated via the derived raw water hardness and the relative proportions of the part-streams.

By experimentally determining the conductivity in the softened or partially softened water, it is possible to keep the surfaces of the measuring electrodes permanently free of limescale. As a result, the conductivity sensors are maintenance-free and always deliver correct measured values.

PREFERRED VARIANTS OF THE INVENTION

Variants in which the Conductivity of the Soft Water is Determined

Within the context of the invention, the conductivity sensor can be arranged in the soft water region. In this case, a weighting according to the part-streams does not need to be carried out for the determination of the raw water properties such as raw water conductivity or raw water hardness; the method is then particularly simple, in order to determine the raw water hardness, the conductivity $LF_{raw}$ of the raw water can first be derived from the conductivity $LF_{soft}$ of the softened water, and the conductivity $LF_{raw}$ of the raw water can then be converted into a raw water hardness using known calibration functions. Alternatively, it is also possible to determine the raw water hardness directly from the conductivity $LF_{soft}$ of the softened water.

In an advantageous variant of the method according to the invention, the conductivity $LF_{raw}$ of the raw water is derived from the experimentally determined conductivity $LF_{soft}$ of the softened water by means of a conversion function UF, with $LF_{raw}=UF(LF_{soft})$. The conversion function can be stored in the electronic control device, for example, as a characteristic line, a polynomial function or a table of values. The total hardness in the raw water can easily be determined from the raw water conductivity by means of known calibration functions; the application of different calibration functions for different control aspects is readily possible.

Particular preference is given to a further development of this variant, according to which the conversion function UF is chosen to be a constant conversion factor UFK, with $LF_{raw}=UFK*LF_{soft}$, where $0.90 \leq UFK \leq 0.99$ and preferably $0.93 \leq UFK \leq 0.97$. In the softening, that is to say in the stoichiometric exchange of the hardness-producing substances, calcium and magnesium ions, for sodium ions, the conductivity increases slightly. The study of different waters has shown that the percentage increase in the conductivity as a result of softening, independently of the water quality, is almost constant at about 5%, corresponding to a UFK of about 0.95, which represents a preferred value. With this further development, the arithmetic operations for determining the conductivity $LF_{raw}$ of the raw water can be simplified considerably.

According to another further development of the above variant, it is provided that a total hardness I of the raw water, which is used to control a regeneration operation of the softening device, is derived from the derived conductivity $LF_{raw}$ of the raw water by means of a first calibration function K1, and that a total hardness II of the raw water, which is used to control the blending device, is derived from the derived conductivity $LF_{raw}$ of the raw water by means of a second calibration function K2.

The two calibration functions K1 and K2 take account of the fact that the recorded conductivity represents a sum parameter, which records all the ions dissolved in the water, and the conductivity is merely approximately proportional to the water hardness, that is to say to the content of calcium and magnesium ions.

The first calibration function K1 (which is mostly stored in the control device as a calibration curve or calibration characteristic line) is preferably so defined that the water hardness determined therefrom corresponds at least in a good approximation to the maximum water hardness occurring at that conductivity. It is thereby avoided that a regeneration operation is started too late, so that a hardness leakage is reliably avoided. The first calibration function K1 typically uses a calibration of 28-35 µS/cm per ° dH, in particular 30-33 µS/cm per ° dH (where ° dH: degree of German hardness).

The water hardness determined from the second calibration function K2 (which is likewise mostly stored in the control device as a calibration curve or calibration characteristic line) is preferably obtained as the mean of all the water hardnesses that occur at that conductivity. With this second calibration function it is possible to obtain greater agreement between the hardness of the raw water determined from the conductivity and the actual water hardness in the raw water. The adjustment or control of the water hardness in the blended water is accordingly also more accurate. The second calibration function K2 typically uses a calibration of 35-44 µS/cm per ° dH, in particular 38-41 µS/cm per ° dH.

By using the two calibration functions, accurate blending is ensured, hardness leakages reliably being avoided at the same time.

K1 and K2 are preferably different, the total hardness I derived from the first calibration function K1 in particular being greater at least piecewise than the total hardness II derived from the second calibration function K2. The raw water hardness, which is used to control the regeneration operation and the blending device, can be determined only approximately from the measured conductivity. Different requirements apply to the regeneration operation and the blending device, and these are laid down in standards DIN EN 14743 and DIN 19636-100. By using different calibration functions, two approximate values for the total hardness of the raw water are obtained. With one approximate value, the regeneration operation can be so controlled that a hardness leakage is avoided and at the same time the minimum exchange capacity specified in DIN EN 14763 of 4 mol (400 g of $CaCO_3$) per kilo of regeneration salt used is observed, while the second approximate value accurately controls the blending device in such a manner that the tolerance limits laid down in DIN 19636-100 for the blended water are met.

Likewise advantageous is a variant of the method according to the invention which is characterised in that a total hardness I of the raw water, which is used to control a regeneration operation of the softening device, is derived directly from the experimentally determined conductivity $LF_{soft}$ of the softened water by means of a first total calibration function GK1, and in that a total hardness II of the raw water, which is used to control the blending device, is determined directly from the experimentally determined conductivity $LF_{soft}$ of the softened water by means of a second total calibration function GK2. As described above, it is possible by using the two total calibration functions GK1 and GK2 to ensure accurate blending, hardness leakages reliably being avoided at the same time. The direct determination of the raw water hardness (without intermediate determination of the raw water conductivity) is particularly quick. A total calibration function can correspond in particular to a combination of conversion function and calibration function, or also assign directly empirically determined values. GK1 and GK2 are preferably different, the total hardness I derived from the first total calibration function GK1 in particular being greater at least piecewise than the total hardness II derived from the second total calibration function GK2.

Variants in which the Conductivity of the Blended Water is Determined

Within the context of the invention, the conductivity $LF_{raw}$ of the raw water can also be determined from the conductivity $LF_{blend}$ of the blended water, generally taking into account the ratio of the part-streams $V(t)_{part1soft}$ and $V(f)_{part2raw}$. A true conversion of the conductivity $LF_{soft}$ of the softened water contained in the blended water can here take place with weighting according to the part-streams. Alternatively, the conductivity $LF_{raw}$ of the raw water can also be determined in a simplified manner by applying a multiplier to the conductivity $LF_{blend}$ of the blended water, which multiplier is dependent on the part-streams and increases as the raw water content increases; typically, with a raw water content of 0% the multiplier is about 0.95 (or another value in the range from 0.90 to 0.99, preferably in the range from 0.93 to 0.97, according to the local conditions), with a raw water content of 100% the multiplier is 1, and the intermediate values of the multiplier are interpolated linearly. Other approximations are also possible within the context of the invention. The raw water hardness can then be determined (calculated) in a simple manner from the (approximately) determined conductivity $LF_{raw}$ of the raw water by means of known calibration functions. It is also possible to determine the raw water hardness directly from the conductivity $LF_{blend}$ of the blended water, generally taking into account the ratio of the part-streams $V(t)_{part1soft}$ and $V(t)_{part2raw}$.

In a preferred variant of the method according to the invention, it is provided that the conductivity $LF_{raw}$ of the raw water is derived from the experimentally determined conductivity $LF_{blend}$ of the blended water with the formula $$LF_{blend} = \frac{V(t)_{part1soft}}{V(t)_{blend}} \cdot UF^{-1}(LF_{raw}) + \frac{V(t)_{part2raw}}{V(t)_{blend}} \cdot LF_{raw}$$

In particular wherein the formula is solved for $LF_{raw}$, wherein UF denotes a conversion function with which the conductivity $LF_{raw}$ of the raw water is obtained from the conductivity $LF_{soft}$ of the softened water, with $LF_{raw}$=UF ($LF_{soft}$), and $UF^{-1}$ denotes the inverse function of UF. By means of the formula, the determination of the raw water conductivity $LF_{raw}$ can be carried out very accurately taking into account the (relative) part-streams. With the inverse function $UF^{-1}$ of the conversion function, the conductivity $LF_{soft}$ of the softened water can be replaced in the formula according to $UF^{-1}(LF_{raw})$=$LF_{sort}$. If necessary, the determination of $LF_{raw}$ can also be carried out numerically, in particular when it is difficult to solve the formula for $LF_{raw}$. The (relative) part-streams can be determined directly or indirectly by means of flow meters, or can be assessed via the adjustment position of the blending device.

A particularly preferred further development of the above method variant provides that the conversion function UF is chosen to be a constant conversion factor UFK, with $LF_{raw}$=UFK*$LF_{soft}$, wherein 0.90≤UFK≤0.99 and preferably 0.93≤UFK≤0.97, so that $$LF_{raw} = \frac{LF_{blend}}{\left(\frac{V(t)_{part1soft}}{UFK \cdot V(t)_{blend}} + \frac{V(t)_{part2raw}}{V(t)_{blend}}\right)}$$

With a constant conversion factor, the determination of $LF_{raw}$ is facilitated, in particular the above formula can readily be solved for $LF_{raw}$.

A further development which is likewise preferred is characterised in that a total hardness I of the raw water, which is used to control a regeneration operation of the softening device, is derived from the derived conductivity $LF_{raw}$ of the raw water by means of a first calibration function K1, and in that a total hardness II of the raw water, which is used to control the blending device, is derived from the derived conductivity $LF_{raw}$ of the raw water by means of a second calibration function K2. By using the two calibration functions K1 and K2, accurate blending can be ensured, as already described above, hardness leakages reliably being avoided at the same time. K1 and K2 are preferably different, the total hardness I derived from the first calibration function K1 in particular being greater at least piecewise than the total hardness II derived from the second calibration function K2.

Likewise preferred is a method variant which provides that a total hardness I of the raw water, which is used to control a regeneration operation of the softening device, is derived directly from the experimentally determined conductivity $LF_{blend}$ of the blended water and the two part-streams $V(t)_{part1soft}$ and $V(t)_{part2raw}$ by means of a first weighted total calibration function GGK1, and that a total hardness II of the raw water, which is used to control the blending device, is derived directly from the experimentally determined conductivity $LF_{blend}$ of the blended water and the two part-streams $V(t)_{part1soft}$ and $V(t)_{part2raw}$ by means of a second weighted total calibration function GGK2. As described above, accurate blending can be ensured by using the two weighted total calibration functions GGK1 and GGK2, hardness leakages reliably being avoided at the same time. The direct determination of the raw water hardness (without intermediate determination of the raw water conductivity) is particularly quick. GGK1 and GGK2 are preferably different, the total hardness I derived from the first weighted total calibration function GGK1 in particular being greater at least piecewise than the total hardness II derived from the second weighted total calibration function GGK2. The weighted total calibration function can correspond in particular to a combination of the above formula for determining $LF_{raw}$ (which uses the conversion function or the inverse function thereof) and a calibration function, or also assign directly empirically determined values.

Water Treatment Systems According to the Invention

The present invention also provides a water treatment system, having
- a softening device, in particular comprising an ion-exchange resin,
- a conductivity sensor,
- an electronic control device, and
- an automatically adjustable blending device for mixing a blended water stream $V(t)_{blend}$ from a first, softened part-stream $V(t)_{part1soft}$ and a second, raw-water-carrying part-stream $V(t)_{part2raw}$, which water treatment system is characterised in that the conductivity sensor is arranged in the region of the softened water or of the blended water, and in that the control device is configured to carry out an above-described method according to the invention. The water treatment system according to the invention is of simple construction in terms of apparatus. The conductivity sensor cannot become calcified and is maintenance-free. Regular decalcification is not required. The control device can store all the functions necessary for carrying out the operating method, for example a conversion function UF or a calibration function.

In a preferred embodiment of the water treatment system according to the invention, the electronic control device has a memory with a plurality of stored calibration functions (K1, K2) and/or with a plurality of stored total calibration functions (GK1, GK2) and/or with a plurality of stored weighted total calibration functions (GGK1, GGK2) for calculating the conductivity $LF_{raw}$ of the raw water and/or the total hardness of the raw water from the conductivity $LF_{soft}$ of the softened water or from the conductivity $LF_{blend}$ of the blended water. The storage of the plurality of functions mentioned above allows the control of the regeneration and the control of the blending to be based on different raw water hardnesses and thus allows the certainty that regeneration is taking place in good time and the accuracy of the blending to be increased at the same time.

Likewise preferred is an embodiment in which at least two flow meters are present for the direct or indirect experimental determination of the part-streams $V(t)_{part1soft}$ and $V(t)_{part2raw}$. The control of the blending and of the regeneration can take place particularly accurately as a result; in particular, when the conductivity sensor is arranged in the blended water, exact weighting of the part-streams can be carried out. Alternatively, it is possible to assess the relative proportions of the part-streams via knowledge of the adjustment position of the blending device.

Finally, the present invention also provides the use of an above-described water treatment system according to the invention in an above-described method according to the invention.

Further advantages of the invention will become apparent from the description and the drawing. Likewise, the features mentioned above and described hereinbelow can be used according to the invention in each case individually or in any desired combinations. The embodiments shown and described are not to be understood as being an exhaustive list but rather are of exemplary nature for describing the invention.

DETAILED DESCRIPTION OF THE INVENTION AND DRAWING

The invention is shown in the drawing and is explained in detail by means of exemplary embodiments. In the drawing:

FIG. 3 shows, in the form of a diagram, the measured conductivity of raw water ($LF_{raw}$) in dependence on the titrimetrically determined total hardness of the raw water in the case of different drinking waters.

Figure 1:
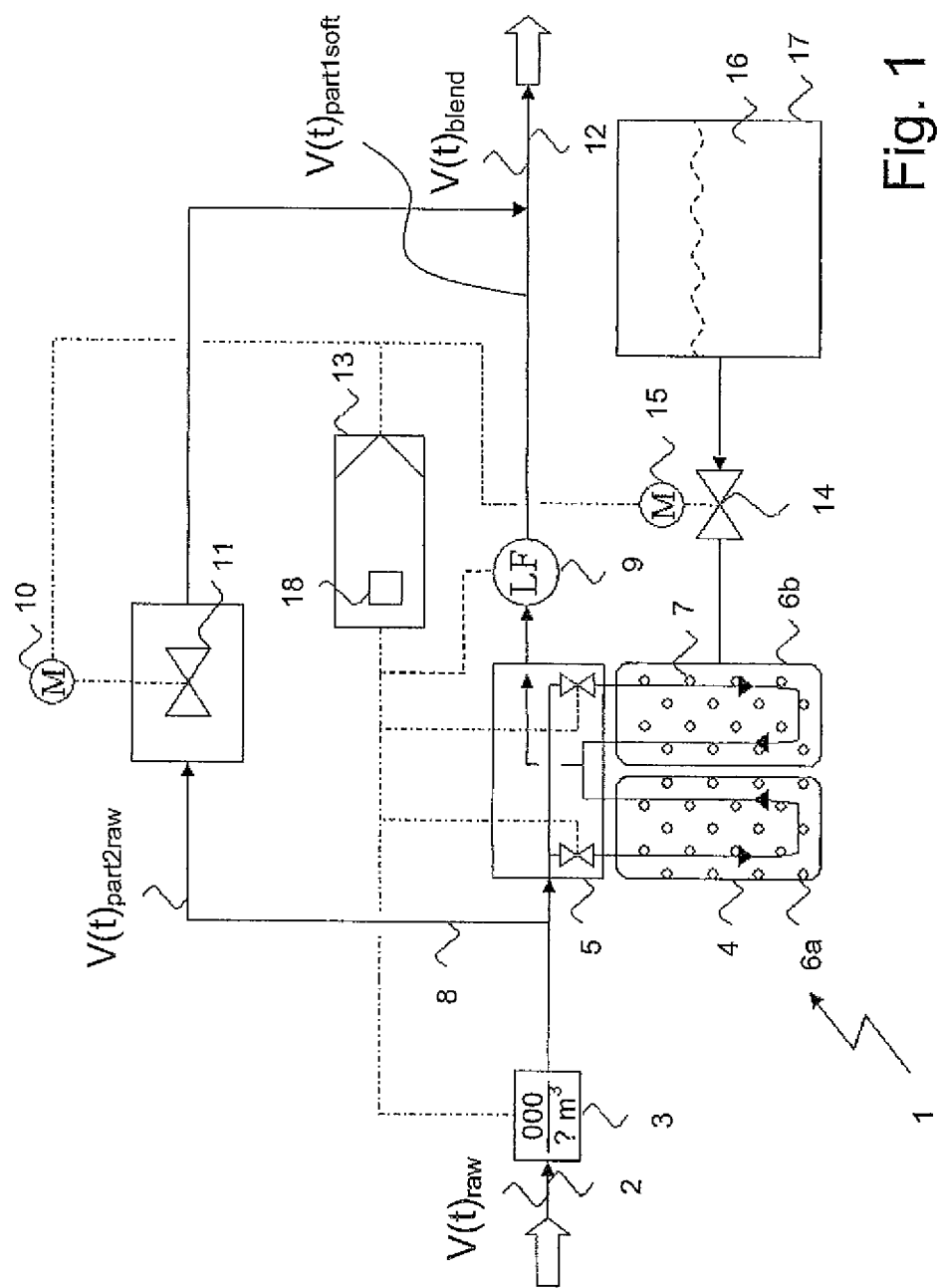
FIG. 1 shows the schematic construction of a water treatment system according to the invention.

FIG.1 shows by way of example a water treatment system 1 according to the invention, which is connected by way of an inlet 2 to a local water supply system, for example the drinking water network. The (total) raw water stream $V(t)_{raw}$ flowing at the inlet 2 first passes through a flow meter 3 and then divides into two part-streams.

A first part of the (total) raw water stream $V(t)_{raw}$ flows to a softening device 4, which in particular has a control head 5 as well as two tanks 6a, 6b containing ion-exchange resin 7. A second part flows into a bypass line 8.

The raw water flowing into the softening device 4 flows through the two tanks 6a, 6b containing ion-exchange resin 7, the raw water being softened completely ($V(t)_{part1soft}$). The hardness-producing substances, calcium and magnesium ions, are thereby exchanged stoichiometrically for sodium ions. The softened water then flows through a conductivity sensor 9, with which the conductivity in the softened part-stream is determined.

The second part of the raw water $V(t)_{part2raw}$ in the bypass line 8 passes through an automatically operable blending device, here a blending valve 11 adjustable by means of a servomotor 10.

The first part-stream $V(t)_{part1soft}$ and the second part-stream $V(t)_{part2raw}$ are finally combined to form a blended water stream $V(t)_{blend}$, which flows to an outlet 12. The outlet 12 is connected to a downstream water installation, for example the fresh water supply lines of a building.

The measurement results of the conductivity sensor 9 and of the flow meter 3 are transmitted to an electronic control device 13.

The control device 13 has as a particular feature according to the invention a memory 18 for (here) a plurality of functions (which are preferably stored as characteristic lines), with which the instantaneous water hardness of the raw water $WH_{raw}^{Inst}$ is determined from the measurement results of the conductivity sensor 9 in the softened water stream $V(t)_{part1soft}$. The functions take account of the fact that the calcium and magnesium ions have been exchanged stoichiometrically in the softened part-stream $V(t)_{part1soft}$, that is to say in each case one hardness-producing substance has been exchanged for two sodium ions, as a result of which the conductivity has changed specifically. In the exemplary embodiment, a conversion function UF is stored in the control device 13, or in the memory 18, with which the measured conductivity $LF_{soft}$ of the softened water is converted into an associated conductivity $LF_{raw}$ of the raw water. Two calibration functions K1 and K2 are further stored, by means of which the conductivity $LF_{raw}$ of the raw water can be converted into a raw water hardness for the purpose of controlling the regeneration (via the calibration function K1) and into a raw water hardness for the purpose of controlling the blending (via the calibration function K2).

A desired target value (SW) of the water hardness of the blended water is likewise stored in the control device. From the target value (SW) of the blended water hardness and the instantaneous water hardness $WH_{raw}^{Inst}$ in the raw water, the control device 13 determines an instantaneous target ratio of the part-streams $V(t)_{part1soft}$ and $V(t)_{part2raw}$, which gives the desired water hardness in the blended water. The proportions of the two part-streams $V(t)_{part1soft}$ and $V(t)_{part2raw}$ are established by adjusting the blending device. In the exemplary embodiment shown, the relative proportions of the part-streams are assessed from the (known) adjustment position of the blending valve 11; alternatively, an additional flow meter can also be provided, for example in the bypass line 8, so that the second part-stream $V(t)_{part2raw}$ can be determined directly and the first part-stream $V(t)_{part1soft}$ can be determined indirectly as the difference between $V(t)_{raw}$(total) and $V(t)_{part2raw}$.

The electronic control device 13 also monitors the state of depletion of the ion-exchange resin 7 in the two tanks 6a, 6b. When water is removed, the amount of water removed is in each case weighted with the associated instantaneous raw water hardness and subtracted from the current residual capacity. If a tank is depleted, the electronic control device 13 removes the depleted tank from the network and subjects it to regeneration. To that end, a regeneration valve 14 having a servomotor 15 is actuated automatically by the electronic control device 13, as a result of which regenerating agent solution (preferably salt brine) 16 flows through the depleted tank from a storage vessel 17.

Figure 2:
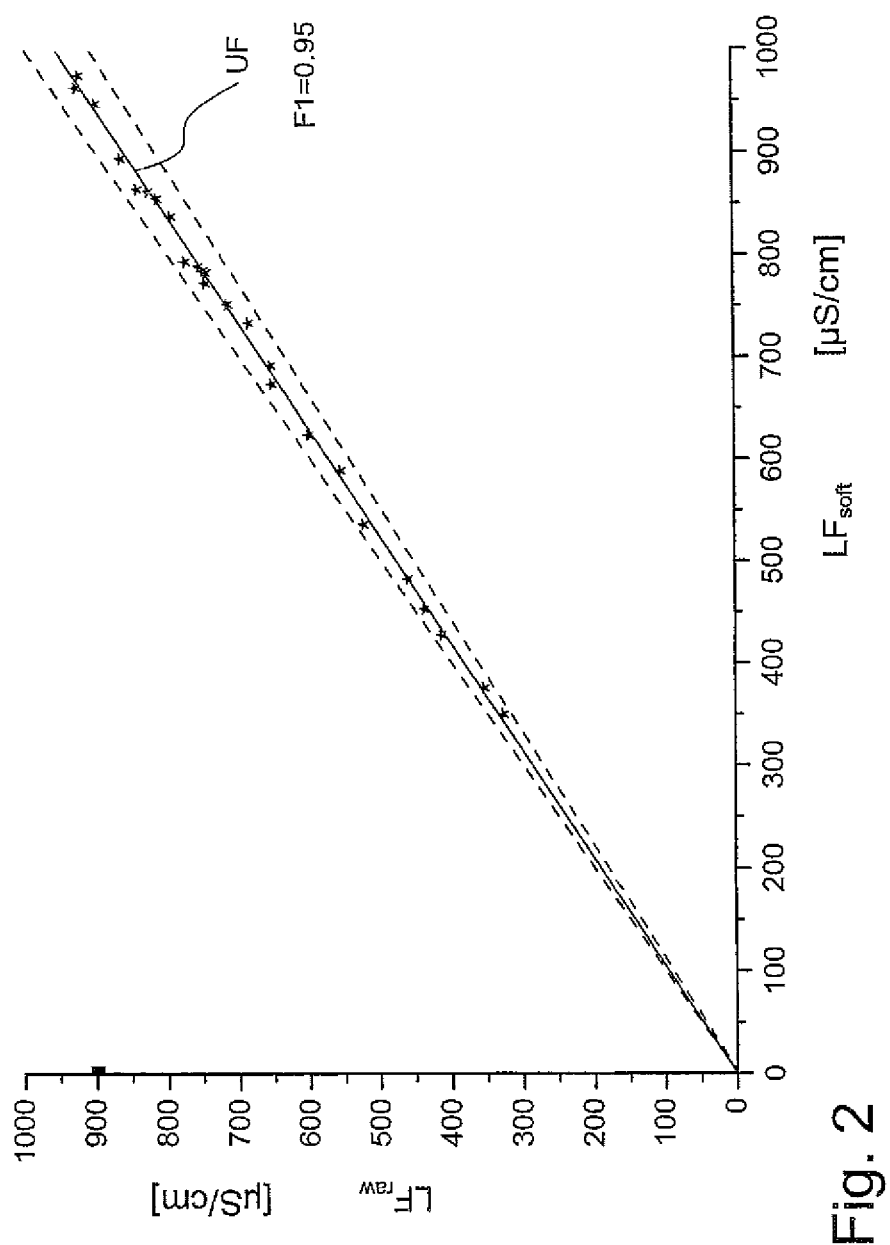
FIG. 2 shows, in the form of a diagram, the measured conductivity of raw water ($LF_{raw}$) in dependence on the measured conductivity after softening ($LF_{soft}$) in the case of different drinking waters.

FIG. 2 shows, in the form of a diagram, the measured conductivity $LF_{raw}$ of the raw water in dependence on the measured conductivity $LF_{soft}$ of the associated softened water in the case of different drinking waters.

In order to prepare the diagram of FIG. 2, drinking waters from different supply networks were tested and their conductivity was determined experimentally. The drinking waters were then softened completely using a water treatment system 1 according to the invention, and the conductivity of the softened waters was again determined experimentally.

FIG. 2 shows that the conductivity $LF_{soft}$ in the softened water increases slightly as a result of the softening, and that the ratio F1 of the conductivity $LF_{raw}$ in the raw water to the conductivity $LF_{soft}$ in the softened water is approximately $F1=LF_{raw}/LF_{soft}=0.95$ for all the water samples. This results, in a good approximation, in a conversion function UF with a linear slope of the value F1, that is to say the conversion function UF has a constant conversion factor UFK=F1, according to $LF_{raw}=UFK*LF_{soft}$. All the experimental values lie within a narrow range, which is bounded by the two broken straight lines. The lower broken straight line has a slope of 0.90, while the slope of the upper broken straight line is 0.99.

The slight increase in the conductivity in the softened water is therefore due to the fact that divalent charge carriers (calcium and magnesium ions) have in each case been exchanged for two monovalent charge carriers.

The approximately linear relationship between the conductivity of the raw water and of the softened water allows the conductivity of the raw water to be determined according to the invention in a good approximation from the experimentally determined conductivity of the softened water by means of a conversion function UF which can be represented as a simple characteristic line.

The operation of conductivity sensors which are used in the softened water cannot be impaired by limescale deposits, so that maintenance-free operation is possible.

FIG. 3 shows, in the form of a diagram, the measured conductivity $LF_{raw}$ in the raw water in dependence on the titrimetrically determined total hardness in the raw water in the case of different drinking waters.

For FIG. 3, about 300 different drinking waters in the Federal Republic of Germany were tested and their conductivity and the total hardness were determined. The conductivity was measured by means of a conductivity meter, while the total hardness was determined titrimetrically.

In contrast to the titrimetric determination method, the derivation of the total hardness from the conductivity can be carried out quickly and simply and is therefore widely used for control in water softening systems. However, it will be seen in FIG. 3 that it is generally possible to deduce from the electrical conductivity of a water not an exact hardness value but merely a range within which the water hardness will actually lie.

Different requirements apply to the regeneration operation and the blending device, and these are laid down in standards DIN EN 14743 and DIN 19636-100. By using different calibration functions K1 and K2 (here calibration characteristic lines), two different approximate values for the total hardness of the raw water as a function of the conductivity $LF_{raw}$ of the raw water are obtained. With one approximate value, the regeneration operation can be so controlled that a hardness leakage is avoided and at the same time the minimal exchange capacity specified in DIN EN 14763 of 4 mol (400 g of $CaCO_3$) per kilo of regenerating salt used is observed, while the second approximate value controls the blending device with such accuracy that the tolerance limits laid down in DIN 19636-100 for the blended water are met.

In FIG. 3, K1 has a slope of about 31 µS/cm° dH and is a line through the origin, while K2 has a slope of about 39 µS/cm° dH and is likewise a line through the origin.

The conductivity of the raw water is derived according to FIG. 2 from the experimentally determined conductivity of the softened water by means of the conversion function UF (which here is linear). The total hardnesses I and II of the raw water are then derived from the conductivity of the raw water according to FIG. 3 by means of the calibration functions K1 and K2. The total hardnesses I and II of the raw water can also be derived directly from the measured conductivity $LF_{soft}$ of the softened water by combining the conversion function UF and the calibration functions K1 and K2.

If the conductivity LF is determined experimentally in the blended water instead is of in the completely softened water, then the conversion function UF must be weighted according to the percentages of the two part-streams.

It will be noted that the conversion function UF and the calibration functions K1 and K2 in the example shown extend as straight lines, which facilitates the mathematical description of the functions. However, non-linear functions are in principle also conceivable according to the invention for the determination of the total hardnesses I and II, and these are approximated, for example, as polynomials.

The invention claimed is:

1. A method for operating a water treatment system, comprising:
   a softening device comprising an ion-exchange resin;
   a single conductivity sensor;
   an electronic control device; and
   an automatically adjustable blending device for mixing a blended water stream $V(t)_{blend}$ from a first, softened part-stream $V(t)_{part1soft}$ and a second, raw-water-carrying part-stream $V(t)_{part2raw}$,
   wherein the conductivity $LF_{soft}$ of the softened water or the conductivity $LF_{blend}$ of the blended water is determined by directly measuring with the conductivity sensor,
   further comprised in that the conductivity $LF_{raw}$ of the raw water and/or the total hardness of the raw water is calculated from the directly measured conductivity $LF_{soft}$ of the softened water or $LF_{blend}$ of the blended water and applying a conversion function UF to it, where $LF_{raw}=UF(LF_{soft})$ where the conversion function UF is chosen to be a constant conversion factor UFK, with $LF_{raw}=UKF(LF_{soft})$, wherein 0.90≤UFK≤0.99,
   wherein the calculated conductivity $LF_{raw}$ of the raw water and/or total hardness of the raw water is used to adjust the hardness of the blended water stream $V(t)_{blend}$ by correspondingly adjusting the mixing ratios of the two part-streams $V(t)_{part1soft}$ and $V(t)_{part2soft}$ to a given desired value (SW).

2. The method according to claim 1, wherein a total hardness I of the raw water, which is used to control a regeneration operation of the softening device, is calculated by means of a first calibration function K1 from the calculated conductivity $LF_{raw}$ of the raw water, and wherein a total hardness II of the raw water, which is used to control the blending device, is calculated by means of a second calibration function K2 from the calculated conductivity $LF_{raw}$ of the raw water.

3. The method according to claim 1, wherein a total hardness I of the raw water, which is used to control a regeneration operation of the softening device, is calculated directly by means of a first total calibration function GK1 from the directly measured conductivity $LF_{soft}$ of the softened water, and wherein a total hardness II of the raw water, which is used to control the blending device, is calculated directly by means of a second total calibration function GK2 from the directly measured conductivity $LF_{soft}$ of the softened water.

4. The method according to claim 1, wherein the conductivity $LF_{raw}$ of the raw water is calculated from the directly measured conductivity $LF_{blend}$ of the blended water with the formula $$LF_{blend} = \frac{V(t)_{part1soft}}{V(t)_{blend}} \cdot UF^{-1}(LF_{raw}) + \frac{V(t)_{part2raw}}{V(t)_{blend}} \cdot LF_{raw}$$

wherein the formula is solved for $LF_{raw}$, and wherein UF denotes the conversion function with which the conductivity $LF_{raw}$ of the raw water is obtained from the conductivity $LF_{soft}$ of the softened water, with $LF_{raw}=UF(LF_{soft})$, and $UF^{-1}$ denotes an inverse function of UF.

5. The method according to claim 4, wherein a total hardness I of the raw water, which is used to control a regeneration operation of the softening device, is calculated by means of a first calibration function K1 from the calculated conductivity $LF_{raw}$ of the raw water, and in that a total hardness II of the raw water, which is used to control the blending device, is calculated by means of a second calibration function K2 from the calculated conductivity $LF_{raw}$ of the raw water.

6. The method according to claim 1, wherein a total hardness I of the raw water, which is used to control a regeneration operation of the softening device, is calculated directly by means of a first weighted total calibration function GGK1 from the directly measured conductivity $LF_{blend}$ of the blended water and the two part-streams $V(t)_{part1soft}$ and $V(t)_{part2raw}$, and in that a total hardness II of the raw water, which is used to control the blending device, is calculated directly by means of a second weighted total calibration function GGK2 from the directly measured conductivity $LF_{blend}$ of the blend water and the two part-streams $V(t)_{part1soft}$ and $V(t)_{part2raw}$.

7. The method according to claim 1, wherein the conversion function UF is chosen to be a constant conversion factor UFK, with $LF_{raw}=UKF(LF_{soft})$, wherein $0.93 \leq UFK \leq 0.97$.

8. The method according to claim 4, wherein the conversion function UF is chosen to be a constant conversion factor UFK, with $LF_{raw}=UKF(LF_{soft})$, wherein $0.93 \leq UFK \leq 0.97$, so that $$LF_{raw} = \frac{LF_{blend}}{\left(\frac{V(t)_{part1soft}}{UFK \cdot V(t)_{blend}} + \frac{V(t)_{part2raw}}{V(t)_{blend}}\right)}.$$

9. A method for operating a water treatment system, comprising:
establishing a raw water flow and a softened water flow, where the softened water flow has passed through an ion-exchange resin;
measuring a conductivity of only the softened water flow with a single conductivity sensor;
calculating a conductivity of the raw water flow by multiplying the conductivity of the softened water flow with a conversion factor, where the conversion factor is equal to or greater than 0.93 and less than or equal to 0.97;
mixing the raw water flow and the softened water flow to produce a blended water flow; and
utilizing the measured conductivity of the softened water flow and the calculated conductivity of the raw water flow to achieve a desired final hardness of the blended water flow by adjusting flow rates of the softened water flow and raw water flow.

10. A method for operating a water treatment system, comprising:
establishing a raw water flow and a softened water flow, where the softened water flow has passed through an ion-exchange resin;
mixing the raw water flow and the softened water flow to produce a blended water flow;
measuring a conductivity of only the blended water flow using only one conductivity sensor;
determining the flow rate of the raw water flow, the softened water flow and the blended water flow;
calculating a conductivity of the raw water flow and a conductivity of the softened water flow by using the proportional flow rates of the raw water flow and softened water flow and a conversion factor of raw water conductivity to softened water conductivity, wherein the conversion factor is equal to or greater than 0.93 and less than or equal to 0.97; and
utilizing the calculated conductivity of the softened water flow and the calculated conductivity of the raw water flow to achieve a desired final hardness of the blended water flow by adjusting the flow rates of the softened water flow and raw water flow.

* * * * *

UNITED STATES PATENT AND TRADEMARK OFFICE
CERTIFICATE OF CORRECTION

PATENT NO. : 8,696,912 B2  
APPLICATION NO. : 13/514590  
DATED : April 15, 2014  
INVENTOR(S) : Ralf Soecknick Page 1 of 1

It is certified that error appears in the above-identified patent and that said Letters Patent is hereby corrected as shown below:

In the Claims

Column 11, line 37, "blend water" should read --blended water--.

Signed and Sealed this
Twenty-fourth Day of June, 2014

Michelle K. Lee
*Deputy Director of the United States Patent and Trademark Office*